(12) United States Patent
Oka et al.

(10) Patent No.: US 9,748,874 B2
(45) Date of Patent: Aug. 29, 2017

(54) MOTOR CONTROL DEVICE, MOTOR CONTROL SYSTEM, AND CONTROL METHOD FOR MOTOR CONTROL DEVICE

(71) Applicant: KABUSHIKI KAISHA YASKAWA DENKI, Kitakyushu-shi (JP)

(72) Inventors: Yusuke Oka, Kitakyushu (JP); Tadashi Okubo, Kitakyushu (JP); Hiroshi Hashimoto, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/140,695

(22) Filed: Apr. 28, 2016

(65) Prior Publication Data

US 2016/0241170 A1    Aug. 18, 2016

Related U.S. Application Data

(63) Continuation of application No. PCT/JP2013/079273, filed on Oct. 29, 2013.

(51) Int. Cl.
*H02P 3/18* (2006.01)
*H02P 5/74* (2006.01)
(Continued)

(52) U.S. Cl.
CPC ............... *H02P 5/74* (2013.01); *H02P 3/18* (2013.01); *H02P 27/06* (2013.01); *H02P 5/00* (2013.01)

(58) Field of Classification Search
USPC ....... 318/759, 362, 376, 5, 8, 34, 51, 400.26
See application file for complete search history.

(56) References Cited

U.S. PATENT DOCUMENTS

2008/0079373 A1* 4/2008 Melfi ................ H02P 3/18
318/63
2009/0251081 A1* 10/2009 Thunes .............. H02P 3/12
318/375
(Continued)

FOREIGN PATENT DOCUMENTS

JP    08-275570 A    10/1996
JP    11-089285 A    3/1999
(Continued)

OTHER PUBLICATIONS

International Search Report issued Jan. 7, 2014 in PCT/JP2013/079273 filed Oct. 29, 2013 (with English Translation).
(Continued)

*Primary Examiner* — Jorge L Carrasquillo
(74) *Attorney, Agent, or Firm* — Oblon, McClelland, Maier & Neustadt, L.L.P.

(57) ABSTRACT

A motor control device includes DC voltage circuitry which obtains a DC voltage, an inverter which converts the DC voltage obtained by the DC voltage circuitry into an AC voltage that is output to a motor, a voltage detector which detects the DC voltage obtained by the DC voltage circuitry, and regenerative controller circuitry which controls actuation of the regenerative circuit based on the DC voltage detected by the voltage detector. The regenerative controller circuitry waits until a predetermined waiting time period has elapsed and thereafter actuates a regenerative circuit in the DC voltage circuitry, independently of actuation control by second regenerative controller circuitry in a second motor control device that also obtains the DC voltage, after the voltage detector detects that the DC voltage exceeds a predetermined threshold voltage.

20 Claims, 6 Drawing Sheets

(51) Int. Cl.
    *H02P 27/06*     (2006.01)
    *H02P 5/00*     (2016.01)

(56) References Cited

U.S. PATENT DOCUMENTS

| 2010/0140003 | A1* | 6/2010 | Saha | B60L 15/025 |
| | | | | 180/65.285 |
| 2015/0222207 | A1* | 8/2015 | Matsushita | B66F 9/02 |
| | | | | 318/376 |

FOREIGN PATENT DOCUMENTS

| JP | 2004-229376 A | | 8/2004 |
| JP | 2004229376 A | * | 8/2004 |
| JP | 2010-110139 A | | 5/2010 |
| JP | 2010110139 A | * | 5/2010 |
| JP | 2012-175871 A | | 9/2012 |

OTHER PUBLICATIONS

Extended European Search Report dated Jun. 30, 2017, in European Patent Application No. 13896739.3.
Japanese Office Action dated May 23, 2017, in Japanese Patent Application No. 2015-544674 (with English Translation).

\* cited by examiner

MOTOR CONTROL DEVICE, MOTOR CONTROL SYSTEM, AND CONTROL METHOD FOR MOTOR CONTROL DEVICE

CROSS-REFERENCE TO RELATED APPLICATIONS

The present application is continuation of and claims the benefit of priority to International Application No. PCT/JP2013/079273, filed Oct. 29, 2013, the entire contents of which are incorporated herein by reference.

BACKGROUND OF THE INVENTION

Field of the Invention

The present invention relates to a motor control device, a motor control system, and a control method for a motor control device.

Description of Background Art

JP 11-089285 A describes a regeneration method for a system including control devices to control multi-shaft motors, respectively, and a system controller to control each control device. In this system, regenerative load data obtained in each control device is transferred to the system controller, and the system controller changes a regenerative circuit operation level of each control device.

JP 2004-229376 A describes a processing method for regenerative power of inverter devices in a common bus system. In this processing method, when a voltage value of a DC voltage in one inverter device exceeds a regenerative braking start voltage, signals indicating that regenerative braking operation can be started are output to other inverter devices, thereby delaying start of regenerative braking operation of the one inverter device and the other inverter devices so that regenerative circuits of the respective inverter devices are operated simultaneously. The entire contents of these publications are incorporated herein by reference.

SUMMARY OF THE INVENTION

According to one aspect of the invention, a motor control device includes DC voltage circuitry which obtains a DC voltage, an inverter which converts the DC voltage obtained by the DC voltage circuitry into an AC voltage that is output to a motor, a voltage detector which detects the DC voltage obtained by the DC voltage circuitry, and regenerative controller circuitry which controls actuation of the regenerative circuit based on the DC voltage detected by the voltage detector. The regenerative controller circuitry waits until a predetermined waiting time period has elapsed and thereafter actuates a regenerative circuit in the DC voltage circuitry, independently of actuation control by second regenerative controller circuitry in a second motor control device that also obtains the DC voltage, after the voltage detector detects that the DC voltage exceeds a predetermined threshold voltage.

According to another aspect of the invention, a motor control system includes motor control devices, a converter which converts an AC voltage from an AC source into a DC voltage, a capacitor, and connectors each connected to the converter and the capacitor. Each of the motor control devices includes DC voltage circuitry which obtains the DC voltage from the converter via a respective connector of the connectors, an inverter which converts the DC voltage obtained by the DC voltage circuitry into an AC voltage that is output to a motor, a voltage detector which detects the DC voltage obtained by the DC voltage circuitry, and regenerative controller circuitry which controls actuation of a regenerative circuit in the DC voltage circuitry based on the DC voltage detected by the voltage detector, the regenerative controller circuitry waits until a predetermined waiting time period has elapsed and thereafter actuates the regenerative circuit, independently of actuation control by respective regenerative controller circuitry included in other ones of the motor control devices, after the voltage detector detects that the DC voltage exceeds a predetermined threshold voltage, and the connectors of each of the motor control devices are connected to each other.

According to yet another aspect of the invention, a method for controlling a motor control device includes obtaining a DC voltage by DC voltage circuitry in a motor control device including an inverter that converts the DC voltage into an AC voltage to be output to a motor, detecting the DC voltage by a voltage detector in the motor control device, and actuating a regenerative circuit in the DC voltage circuitry by regenerative controller circuitry in the motor control device, after waiting until a predetermined waiting time period has elapsed, independently of actuation control by second regenerative controller circuitry in a second motor control device that also obtains the DC voltage, after the voltage detector detects that the DC voltage exceeds a predetermined threshold voltage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
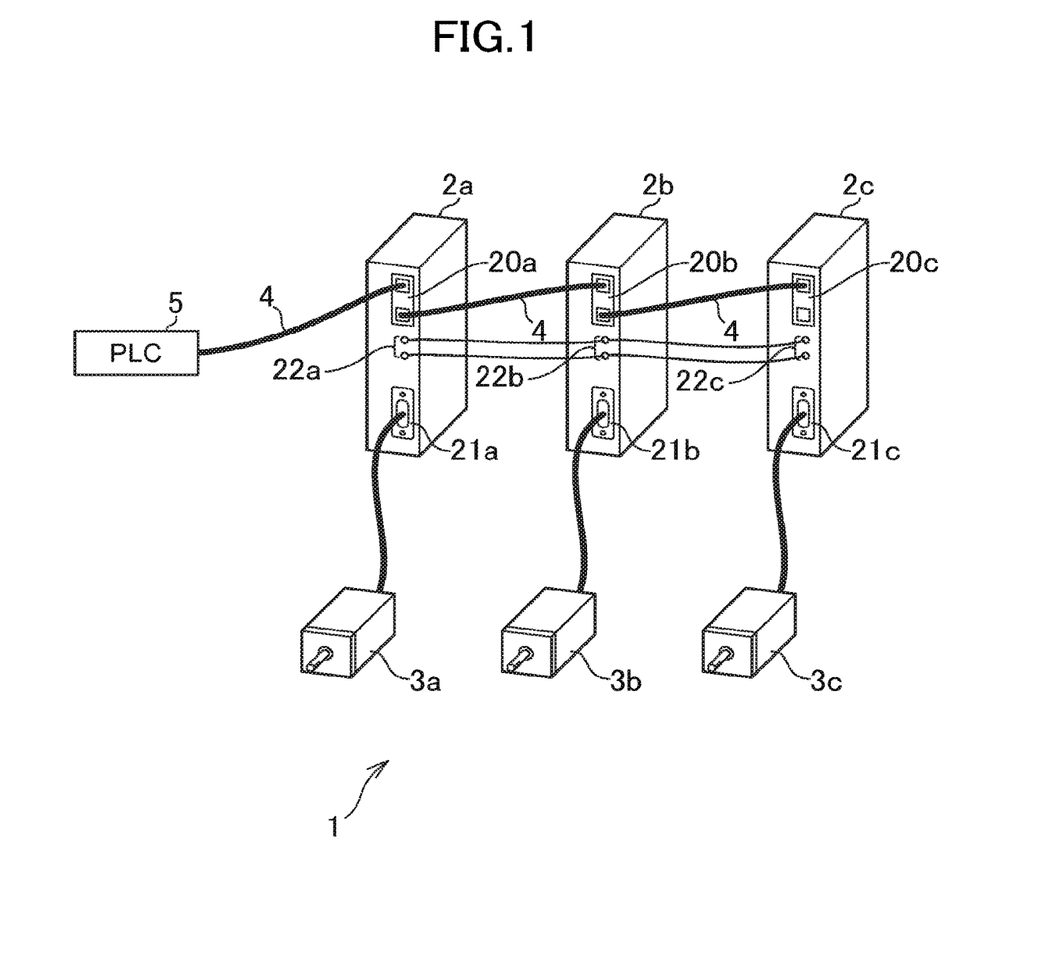
FIG. 1 is a schematic view of an inverter motor control system according to an embodiment of the present invention.

FIG. 1 is a schematic view of a motor control system 1 according to an embodiment of the present invention. The motor control system 1 includes multiple motor control devices (2a, 2b, 2c), and multiple motors (3a, 3b, 3c) connected to the motor control devices (2a, 2b, and 2c), respectively. The system exemplified herein includes three motor control devices (2a, 2b, 2c) and the three motors (3a, 3b, 3c), but the number of the devices and the number of the motors are not particularly limited. Further, capacities of the motors (3a, 3b, 3c) and loads (not shown) that are connected to the motors (3a, 3b, 3c) may differ from each other.

The motor control devices (2a, 2b, 2c) include communication connectors (20a, 20b, 20c), respectively, and are connected to a controller 5 in an upper level, for example, a programmable logic controller (PLC) by a communication line 4, thereby being capable of communicating information to/from the controller 5. The motor control devices (2a, 2b, 2c) control the motors (3a, 3b, 3c), respectively, based on instructions from the controller 5.

Further, the motor control devices (2a, 2b, 2c) respectively include motor connectors (21a, 21b, 21c), and are connected to the motor (3a, 3b, 3c), respectively. The motors (3a, 3b, 3c) are driven with AC power supplied from the motor control devices (2a, 2b, 2c), respectively.

In addition, the motor control devices (2a, 2b, 2c) include connectors (22a, 22b, 22c) serving as connection connectors, respectively. The connectors (22a, 22b, 22c) each include at least two types of connectors called a P-connector and an N-connector. The P-connectors are connected to each other, and the N-connectors are connected to each other. The P-connectors are connected to a positive side of DC voltage units inside the motor control devices (2a, 2b, 2c), which are described later, and the N-connectors are connected to a negative side thereof. The connectors (22a, 22b, 22c) are connected to each other as illustrated in FIG. 1, and hence the DC voltage units inside the motor control devices (2a, 2b, 2c) are electrically shared. A system in which the DC voltage units inside the motor control devices (2a, 2b, 2c) are electrically shared in this way is referred to as a common bus system.

The connectors (22a, 22b, 22c) are not necessarily so-called connectors, and may be any devices capable of electrically connecting to each other the DC voltage units inside the motor control devices (2a, 2b, 2c) that can be functionally distinguished from each other, thereby electrically sharing the DC voltage units. Other than the connector, for example, wiring and terminals on circuit boards of the motor control devices (2a, 2b, 2c) may be connected to each other by means of, for example, soldering, or electric circuits of the motor control devices (2a, 2b, 2c) may be formed on one or more circuit boards in the first place and the electric circuits may be connected to each other by printed wiring in advance.

The motor control devices (2a, 2b, 2c) are each connected to an AC source, but illustrations of a power line and a grounding line are omitted in FIG. 1 in order to simplify the illustration.

Figure 2:
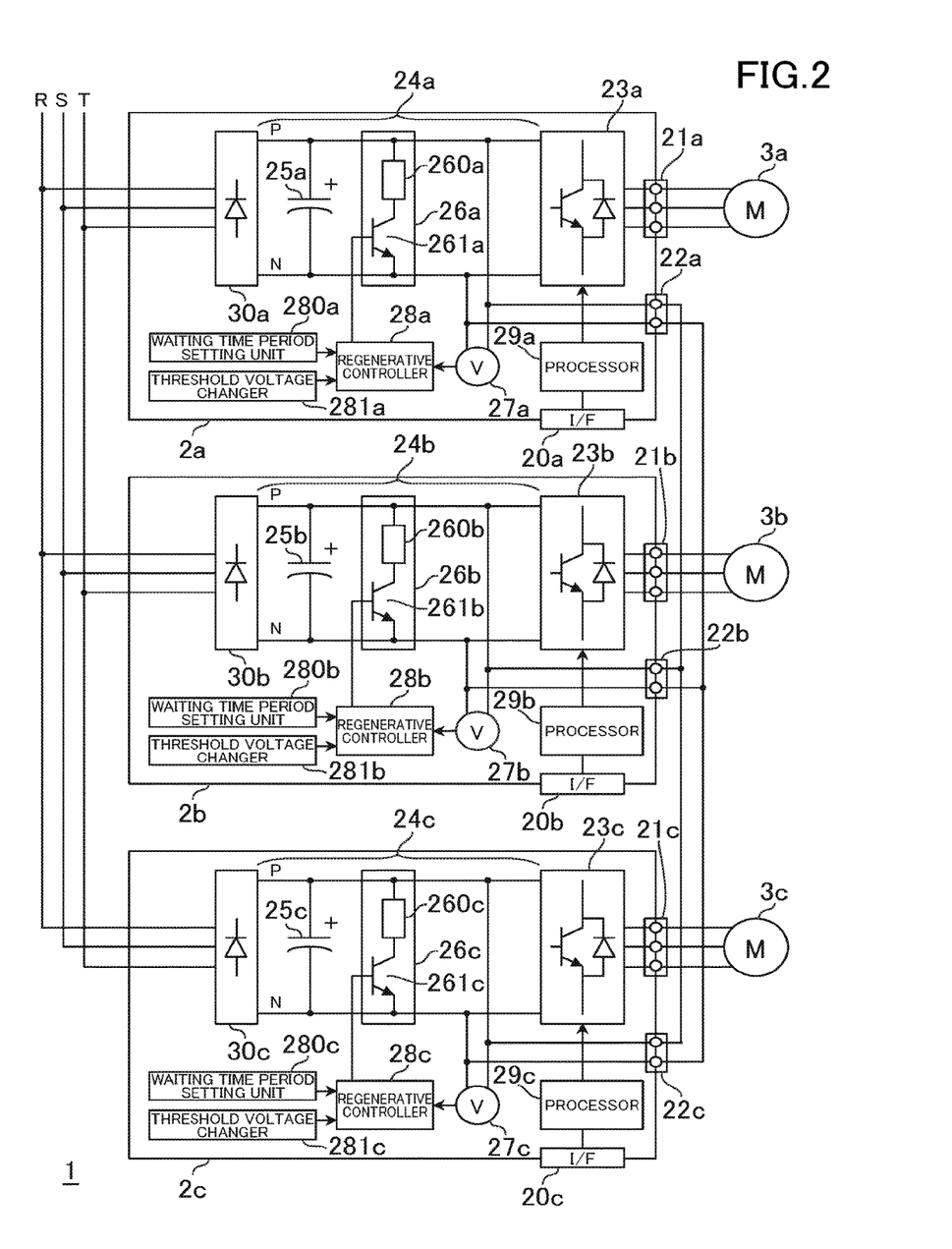
FIG. 2 is a block diagram for illustrating a circuit configuration of the inverter motor control system.

FIG. 2 is a block diagram for illustrating a circuit configuration of the motor control system 1. The three motor control devices (2a, 2b, 2c) are illustrated in FIG. 2. In the following, suffixes a, b, and c of reference numerals indicate that components with the suffixes a, b, and c correspond to the motor control devices (2a, 2b, 2c), respectively. Further, the configurations of the motor control devices (2a, 2b, 2c) are basically the same, and hence the motor control device (2a) is described in detail as a representative.

The motor control device (2a) includes a converter (30a) which converts an AC voltage from the AC source into a DC voltage, and an inverter (23a) which converts the DC voltage generated by the converter (30a) into an AC voltage again. Connection lines between the converter (30a) and the inverter (23a) include a line having a positive voltage, which is referred to as a P-line, and a line having a negative voltage, which is referred to as an N-line. A unit in which a DC voltage is maintained by the P-line and the N-line is referred to as a DC voltage unit (24a).

A capacitor (25a) which makes a rectification action and a charge accumulation action is connected between the P-line and the N-line in the DC voltage unit (24a). In addition, a regenerative circuit (26a) is connected between the P-line and the N-line. The regenerative circuit (26a) includes a regenerative resistor (260a) and an analog switch (261a).

In addition, a voltage detector (27a) which detects a voltage between the P-line and the N-line in the DC voltage unit (24a) is connected, and a DC voltage that is a detection result of the voltage detector (27a) is input to a regenerative controller (28a). The regenerative controller (28a) controls the analog switch (261a) of the regenerative circuit (26a) based on a DC voltage. Further, a processor (29a) programmed to receive instructions from an external device via the communication connector (20a), thereby controlling the inverter (23a). A waiting time period setting unit (280a) and a threshold voltage changer 281a illustrated in FIG. 2 are described later.

In this embodiment, an AC source connected to the converter (30a) is a three-phase AC source in three phases of R, S and T. However, the AC source may be a single-phase AC source or a two-phase AC source with no problem. Further, an electrolytic capacitor is used as the capacitor (25a) because the capacitor (25a) is required to have a sufficient capacitance and voltage resistance, but the capacitor (25a) is not limited thereto and may be a condenser or a capacitor in any form. A form of the voltage detector (27a) is not limited, but a so-called D/A converter may be used as the voltage detector (27a) because a value of a DC voltage is output to the regenerative controller (28a) as a digital value. The regenerative controller (28a) is any information processing device such as a microcontroller, a digital signal processor (DSP), or a field programmable gate array (FPGA), and circuits accompanying thereto, and is programmed to perform predetermined information processing on a DC voltage detected by the voltage detector (27a) to switch on and off of the analog switch (261a), thereby controlling whether or not to actuate the regenerative circuit (26a). The processor is also any information processing device. In FIG. 2, the regenerative controller (28a) and the processor (29a) are illustrated as components independent of each other, but the regenerative controller (28a) and the processor (29a) may be one information processing device. In this case, each of the function as the regenerative controller (28a) and the function as the processor (29a) is realized by a program that is executed on the information processing device.

The inverter (23a) is connected to the motor (3a) by the motor connector (21a). The motor (3a) in this embodiment is a squirrel-cage three-phase induction motor, and hence the inverter (23a) generates three-phase AC. A form of the motor (3a) is not particularly limited. The inverter (23a) generates AC suitable for driving the motor (3a).

In addition, the connector (22a) is connected to each of the connector (22b) of the motor control device (2b), and the connector (22c) of the motor control device (2c). This connection is made in order that P-lines are short-circuited to each other and N-lines are short-circuited to each other in the DC voltage units (24a, 24b, 24c). With this, DC voltages in the DC voltage units (24a, 24b, 24c) are equal to each other throughout the motor control devices (2a, 2b, 2c). With this, when any one of the motors (3a, 3b, 3c), for example, the motor (3c) performs speed-reduction braking, power (so-called regenerative power) obtained from the inverter (23c) can be used for driving the other motors (3a, 3b), or can be stored in the capacitors (25a, 25b).

Depending on modes of the speed-reduction braking of the motors (3a, 3b, 3c), and charged states of the capacitors (25a, 25b, 25c), a DC voltage is remarkably high during regeneration in some cases. If such a situation occurs, there arises a problem in that the device may be damaged, for example. Thus, when it is detected that a DC voltage in the DC voltage unit (24a) exceeds a predetermined threshold voltage, the regenerative controller (28a) turns on the analog switch (261a), thereby actuating the regenerative circuit (26a). With this, current flows through the regenerative resistor (260a) and power is consumed, thereby decreasing an excessively high voltage. This is basic operation of the regenerative controller (28a). A load caused during actuation of the regenerative circuit (26a), in other words, power that is consumed by the regenerative circuit (26a) is herein referred to as a regenerative load.

However, if the regenerative controller (28a) simply actuates the regenerative circuit (26a) when a DC voltage exceeding a predetermined threshold voltage is detected, the regenerative load is concentrated on a certain device. This fact is described with reference to FIG. 3.

Figure 3:
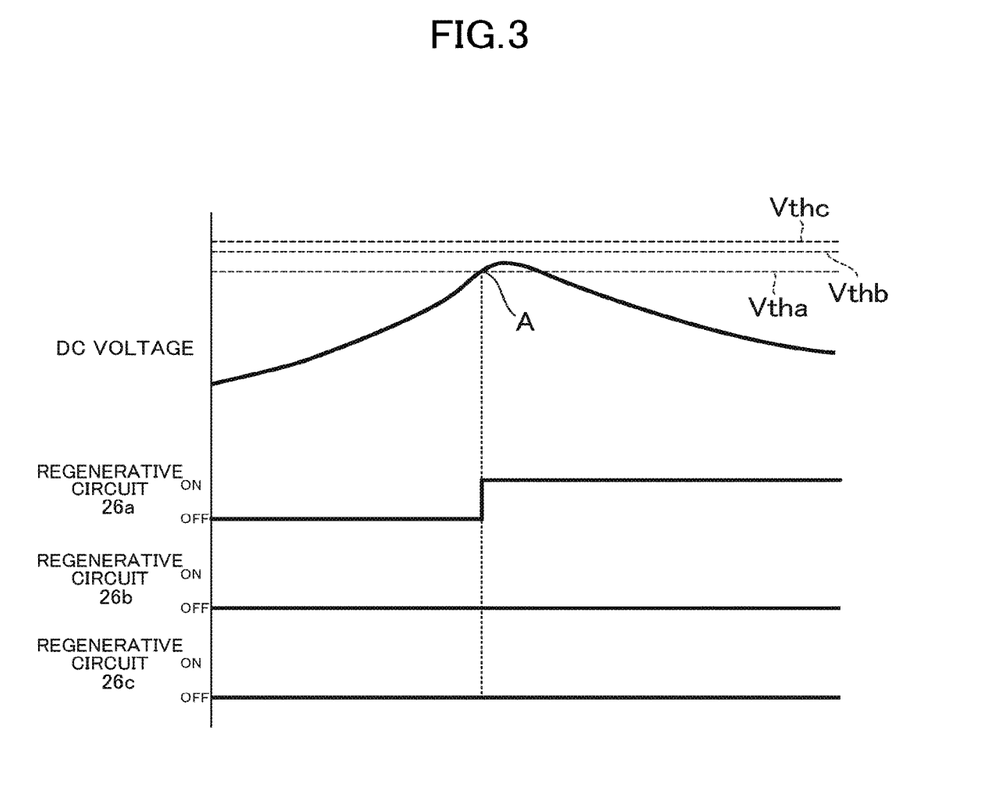
FIG. 3 is a diagram for illustrating a mechanism of a concentration of a regenerative load on a certain device.

FIG. 3 is a diagram for illustrating a mechanism of a concentration of a regenerative load on a certain device. In FIG. 3, the horizontal axis represents time, and the vertical axis represents a change in DC voltage value and differences of an actuated state or a non-actuated state in the regenerative circuits (26a, 26b, 26c).

Even if threshold voltages determined by the regenerative controllers (28a, 28b, 28c) are all the same, in actuality, those threshold voltages slightly differ from each other due to individual differences between the devices. In view of this, it is assumed that Vtha<Vthb<Vthc is satisfied as illustrated in FIG. 3, where Vtha, Vthb, and Vthc represent actual threshold voltages of the motor control devices (2a, 2b, 2c), respectively.

Then, if any one of or more motors performs speed-reduction braking, and regenerative operation is performed, a DC voltage is increased as illustrated in FIG. 3. Then, at a time point A at which the DC voltage reaches Vtha, the regenerative circuit (26a) is actuated. As a result, power is consumed by the regenerative circuit (26a), and the DC voltage starts to decrease. Consequently, the DC voltage does not reach Vthb and Vthc, and all the regenerative loads are concentrated only on the regenerative circuit (26a) to impose a large load on the motor control device (2a). This phenomenon repeatedly occurs in the regenerative circuit (26a), and results in a shorter device life of the motor control device (2a), and less efficiency because the regenerative circuits (26b, 26c) are barely used.

In view of this, in the motor control device (2a) according to this embodiment, the regenerative controller (28a) waits until a predetermined waiting time period has elapsed, and then actuate the regenerative circuit (26a), after it is detected that a DC voltage exceeds a predetermined threshold voltage. With this, regenerative loads can be distributed to the respective devices instead of being concentrated on a certain device.

Figure 4:
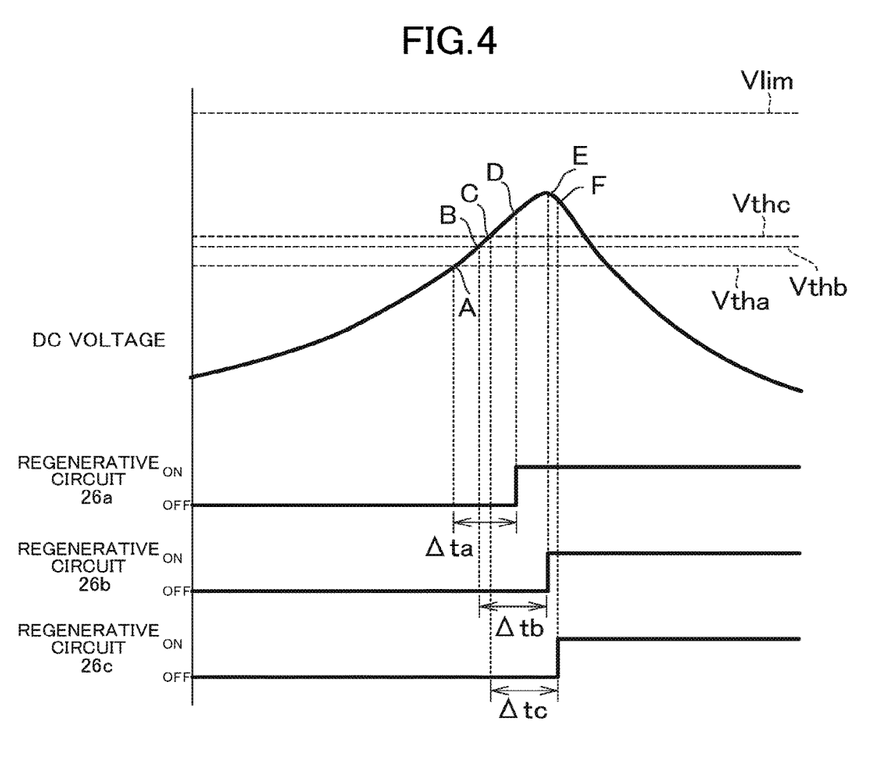
FIG. 4 is a diagram for illustrating a mechanism of a distribution of regenerative loads to respective devices in the inverter motor control system according to the embodiment of the present invention.

FIG. 4 is a diagram for illustrating a mechanism of a distribution of regenerative loads to the respective devices in the motor control system 1 according to this embodiment. In FIG. 4, similarly to FIG. 3, the horizontal axis represents time, and the vertical axis represents a change in DC voltage value and differences of the actuated state or the non-actuated state in the regenerative circuits (26a, 26b, 26c).

Waiting time periods of the motor control devices (2a, 2b, 2c) may not necessarily be the same. The waiting time periods of the motor control devices (2a, 2b, 2c) are herein represented by Δta, Δtb, and Δtc, respectively.

Similar to the example described above, if any one of or more motors perform speed-reduction braking, and regenerative operation is performed, a DC voltage is increased. However, at the time point A at which the DC voltage reaches Vtha, the regenerative circuit (26a) is not actuated yet, and the regenerative controller (28a) starts timer counting, and waits until Δta has elapsed. Thus, the DC voltage is further increased to reach Vthb at a time point B, and reach Vthc at a time point C. The regenerative controller (28b) starts timer counting at the time point B, and waits until Δtb has elapsed. The regenerative controller (28c) starts timer counting at the time point C, and waits until Δtc has elapsed.

Then, at a time point D where Δta has elapsed since the time point A, the regenerative controller (28a) actuates the regenerative circuit (26a). As a result, in the example illustrated in FIG. 4, the increasing speed of the DC voltage starts to decrease. In addition, at a time point E where Δtb has elapsed since the time point B, the regenerative circuit 26b is actuated by the regenerative controller (28b), and at a time point F where Δtc has elapsed since the time point C, the regenerative controller (26c) is actuated. As a result, all of the regenerative circuits (26a, 26b, 26c) are actuated, and hence the DC voltage is rapidly decreased. Thus, regenerative loads are distributed to the regenerative circuits (26a, 26b, 26c).

As described above, the waiting time periods (Δta, Δtb, Δtc) are appropriately set, thereby being capable of easily distributing the regenerative loads to the respective devices. Further, operation of the regenerative controller (28a) does not depend on operation results of the other regenerative controllers (28b, 28c), but is independent thereof. The same holds true for the other regenerative controllers (28b, 28c). That is, even if a DC voltage in the regenerative controller (28a) exceeds Vtha, no operation instruction is transmitted to the other regenerative controllers (28b, 28c), and vice versa.

This means that it is not necessary to transmit a detection result of a DC voltage in one regenerative controller (28a, 28b or 28c) to the other regenerative controller (28a, 28b or 28c), and to share an operation state of the one regenerative controller between the devices. That is, neither additional upper-level devices for transmission/reception and sharing of such information nor additional wiring is necessary. Thus, in the motor control system 1 according to this embodiment, a concentration of a regenerative load on a certain device is quite easily prevented.

In order to distribute regenerative loads to the respective devices as described above, the above-mentioned threshold voltage and waiting time period are appropriately set. As a matter of course, this setting may be artificially made theoretically or experientially, depending on a capacity and a load of each motor and the sizes of the regenerative resistors. Alternatively, a configuration for automatically adjusting one or both of the threshold voltage and the waiting time period may be added.

The waiting time period setting unit (280a) illustrated in FIG. 2 automatically adjusts the waiting time period (Δta). The waiting time period setting unit (280a) may be any information processing device, and in terms of physical aspects, may be software-implemented as part of the regenerative controller (28a) or part of the processor (29a).

The waiting time period setting unit (280a) automatically adjusts a waiting time period depending on a state of the motor control device (2a). More specifically, the waiting time period setting unit (280a) determines the waiting time period (Δta) based on any one or more of the regenerative resistor (260a) of the regenerative circuit (26a), a capacity of the motor (3a), and a load of the motor (3a).

The size of the regenerative resistor (260a) of the regenerative circuit (26a) may be given in advance, but is desirably automatically detected because the regenerative resistor (260a) may be replaced with more suitable one when the motor control system 1 is built. The detection method may involve, for example, actuating the regenerative circuit (26a) while the inverter (23a) is stopped, and measuring a temporal change in voltage value detected by the voltage detector (27a). The larger regenerative resistor (260a) can handle a heavier regenerative load, and hence a shorter waiting time period is given when the regenerative resistor (260a) is large, whereas a longer waiting time period is given when the regenerative resistor (260a) is small.

The capacity of the motor (3a) may also be given in advance, or may be detected by driving the motor (3a) while the motor (3a) is not connected to a load, and measuring a change in voltage value detected by the voltage detector (27a) or a so-called slip ratio. The load of the motor (3a) may be grasped by performing detection similar to that described above while the detection motor (3a) is connected to the load. The motor (3a) having a larger capacity can handle a heavier regenerative load, and hence a shorter waiting time period is given when the motor (3a) has a large capacity, whereas a longer waiting time period is given when the motor (3a) has a small capacity. Further, the motor (3a) having a large load generates a high regenerative voltage, and hence this regenerative voltage is distributed to the other devices. Thus, it is preferred that a longer waiting time period be given when the motor (3a) has a large load, whereas a shorter waiting time period be given when the motor (3a) has a small load.

As described above, the waiting time period setting unit (280a) automatically sets an appropriate waiting time period without any complicated theoretical calculation and experience.

The threshold voltage changer (281a) automatically adjusts the threshold voltage Vtha. The threshold voltage changer (281a) may be any information processing device, or in terms of physical aspects, may be software-implemented as part of the regenerative controller (28a) or part of the processor (29a) as well. Further, the threshold voltage changer (281a) changes a value of the threshold voltage Vtha determined in advance, thereby adjusting the threshold voltage Vtha, while the motor control system 1 is being operated. The threshold voltage changer (281a) is as described above because a main purpose of the adjustment of the threshold voltage Vtha is to compensate for differences in threshold voltages of the devices due to the individual differences between the devices, and hence it is rational to finely adjust the value based on the individual differences between the devices during the actual operation. Further, the threshold voltage changer (281a) changes the threshold voltage Vtha based on a detection result of a DC voltage.

More specifically, the threshold voltage changer (281a) performs operation of monitoring a detection result of the voltage detector (27a), and when a value thereof exceeds a predetermined limit voltage Vlim (see FIG. 4) that is higher than the threshold voltage Vtha, rising the threshold voltage Vtha a little (by a predetermined amount). This operation is performed based on consideration that the DC voltage is increased to reach the limit voltage Vlim because the own threshold voltage Vtha is too low with respect to the threshold voltages Vthb and Vthc of the other devices, and thus the regenerative circuits (26b, 26c) of the other devices are not operated, thereby causing concentration of a regenerative load on the own regenerative circuit (26a) as a result. In view of this, the threshold voltage Vtha is raised to delay the operation timing of the regenerative circuit (26a) so that the regenerative circuits (26b, 26c) of the other devices are prompted to be operated, thereby avoiding the concentration of the regenerative load. As described above, the threshold voltage changer (281a) has an action of automatically changing the threshold voltage Vtha while the motor control system 1 is being operated, thereby preventing a concentration of a regenerative load on a certain device.

Figure 5:
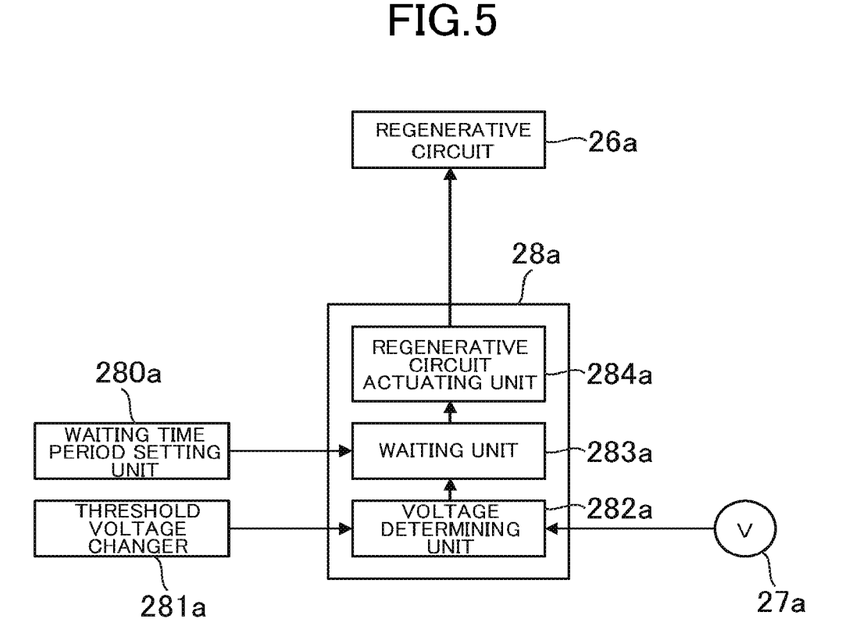
FIG. 5 is a functional block diagram of a regenerative controller.

FIG. 5 is a functional block diagram of the regenerative controller (28a). The regenerative controllers of the motor control devices (2a to 2c) have the same configuration, and hence the regenerative controller (28a) of the motor control device (2a) is herein described as a representative.

The regenerative controller (28a) includes a voltage determining unit (282a). The voltage determining unit (282a) compares a threshold voltage changed and set by the threshold voltage changer (281a), and a voltage detected by the voltage detector (27a) to each other, thereby determining that the detected voltage exceeds the threshold voltage.

The regenerative controller (28a) further includes a waiting unit (283a). The waiting unit (283a) waits until a waiting time period set by the waiting time period setting unit (280a) has elapsed, after the voltage determining unit (282a) determines that the detected voltage exceeds the threshold voltage.

The regenerative controller (28a) still further includes a regenerative circuit actuating unit (284a). The regenerative circuit actuating unit (284a) transmits a signal for actuating the regenerative circuit (26a) to the regenerative circuit (26a), after the waiting unit (283a) finishes waiting.

With those functions of the voltage determining unit (282a), the waiting unit (283a), and the regenerative circuit actuating unit (284a), the regenerative controller (28a) performs the operation described above. The voltage determining unit (282a), the waiting unit (283a), and the regenerative circuit actuating unit (284a) do not necessarily physically exist, and may be functionally realized by programs that are executed on the regenerative controller (28a) or the processor (29a) (see FIG. 2).

In the motor control system 1 described above, it is desired that the connectors (22a to 22c) of all of the motor control devices (2a to 2c) be connected to each other in a common bus system in terms of avoiding a concentration of a regenerative load on a certain device. However, depending on the configuration of the motor control system 1, a part of the motor control devices may not be connected in a common bus system, or the motor control devices may be grouped and a common bus system may be applied for each group. Even in such cases, it is desired that operation of all regenerative controllers of at least motor control devices including connectors connected to each other be dependent of operation results of other regenerative controllers. This is because, in this manner, communication between the motor control devices is unnecessary as described above.

In the above description, the motor control system 1 includes the motor control devices (2a, 2b, 2c) connected to each other in a common bus system, but the motor control device (2a, 2b, or 2c) can of course be used alone. However, for example, when the motor control device (2a) is used alone, the above-mentioned problem of a concentration of a regenerative load on a certain device never arises. Thus, providing a waiting period before actuating the regenerative circuit (26a) even in such a case only results in unnecessary delay of the actuation of the regenerative circuit (26a).

In view of this, the regenerative controller (28a) may not wait when the other motor control devices (2b, 2c) are not connected to the connector (22a). In this case, when the motor control device (2a) is used alone or is used without a common bus system, the regenerative circuit (26a) can be actuated with good response. Whether or not the other motor control devices (2b, 2c) are connected to the connector (22a) may be detected by a switch (not shown) provided to the connector (22a), or may be detected by artificially notifying the motor control device (2a) that a connection is made in a common bus system.

Further, in the above description, the motor control devices (2a to 2c) include the converters (30a to 30c) and the capacitors (25a to 25c), respectively, but the motor control devices (2a to 2c) may not include those components, and may directly input a DC voltage.

Figure 6:
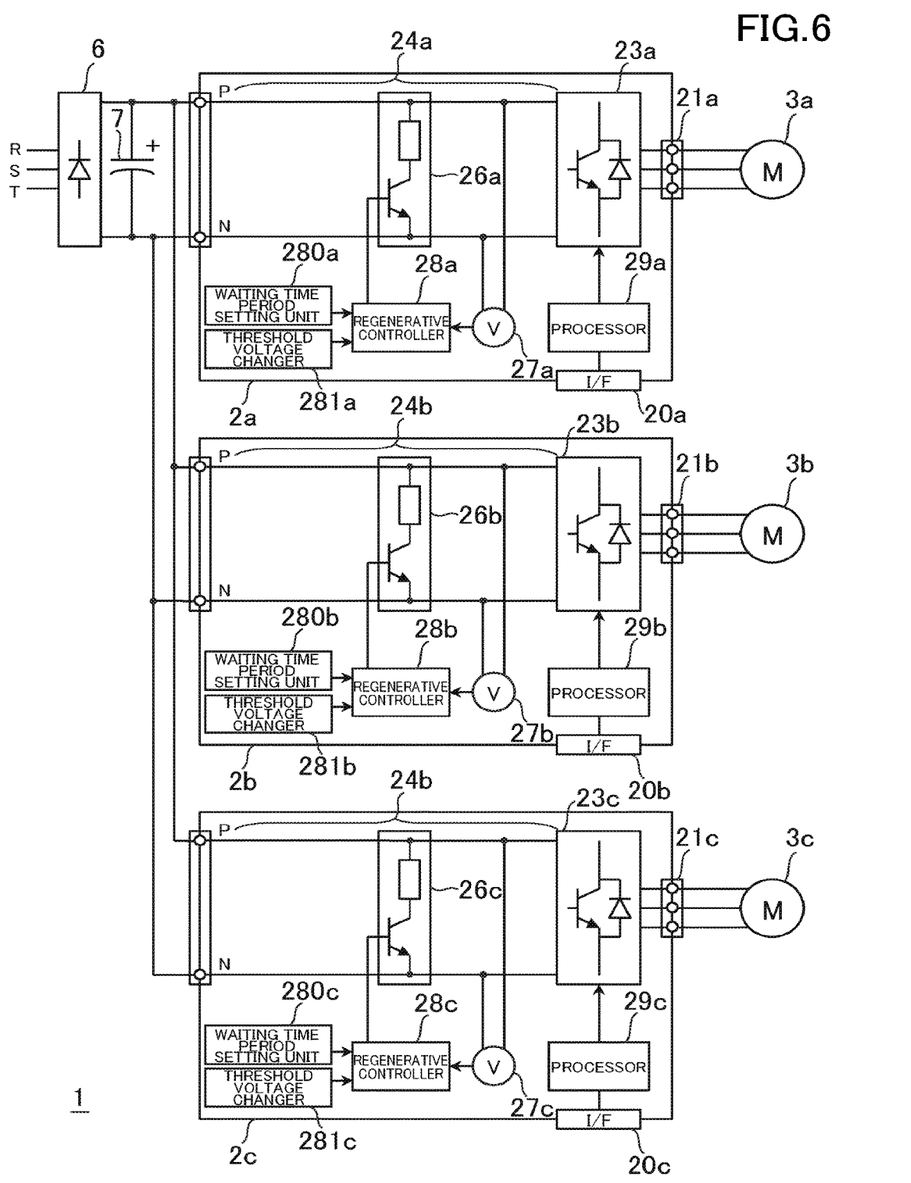
FIG. 6 is a diagram of a modified example of the motor control system.

FIG. 6 is a diagram of a modified example of the motor control system 1. In FIG. 6, common or corresponding configurations to the embodiment described above are denoted by the same reference symbols. Further, description is omitted of components which have configurations equivalent to those in the above-mentioned embodiment, and description of which thus overlaps the description in the above-mentioned embodiment.

In the motor control system 1 according to the modified example, the motor control devices (2a to 2c) do not include the converters (30a to 30c) and the capacitors (25a to 25c) that are provided in the above-mentioned embodiment. Instead, an external converter 6 is provided separately from the motor control devices (2a to 2c), thereby converting RST three-phase AC into DC. Further, to the DC obtained through the conversion, an external capacitor 7 is provided that makes a rectification action and a charge accumulation action.

In addition, the DC obtained through the conversion by the external converter 6 is connected in parallel to the DC voltage units (24a to 24c) of the respective motor control devices (2a to 2c) so that the DC voltage generated by the external converter 6 is input to the DC voltage units (24a to 24c) of the respective motor control devices (2a to 2c). With this, the external converter 6 and the external capacitor 7 are shared between the motor control devices (2a to 2c), and the DC voltage units (24a to 24c) are connected to each other. Thus, this configuration can also be regarded as a type of a common bus system.

That is, the motor control system 1 according to the modified example also has the problem in principle that a regenerative load is concentrated on a certain device, similarly to the above-mentioned embodiment. Thus, the motor control devices (2a to 2c) each include the regenerative controller (28a to 28c) described above so that regenerative loads can be distributed to the respective devices instead of being concentrated on a certain device.

In the motor control devices (2a to 2c) according to the modified example, the DC voltage units (24a to 24c) are connected to the external converter 6, thereby sharing the DC voltage units (24a to 24c), and hence the connectors provided in the above-mentioned embodiment are not necessarily additionally provided (may be provided). Further, in the motor control system 1 according to the modified example, it is only necessary that a common DC voltage be input to the motor control devices (2a to 2c), and hence the external capacitor 7 is not necessarily essential. In addition, in place of or in addition to the use of the external capacitor 7, the motor control devices (2a to 2c) may include the capacitors in the DC voltage units (24a to 24c), respectively, as in the above-mentioned embodiment.

According to one aspect of the present invention, a motor control device includes a DC voltage unit which inputs a DC voltage, a regenerative circuit included in the DC voltage unit, an inverter which converts the DC voltage in the DC voltage unit into an AC voltage that is output to a motor, a voltage detector which detects the DC voltage in the DC voltage unit, and are generative controller which controls whether or not to actuate the regenerative circuit based on the DC voltage detected by the voltage detector. The regenerative controller waits until a predetermined waiting time period has elapsed, and then actuates the regenerative circuit, independently of operation of a regenerative controller of the another motor control device after it is detected that the DC voltage exceeds a predetermined threshold voltage.

According to one aspect of the present invention, the motor control device may further include a converter which converts an AC voltage from an AC source into the DC voltage in the DC voltage unit; a capacitor included in the DC voltage unit, and a connector which connects the DC voltage unit to a DC voltage unit of the another motor control device.

According to one aspect of the present invention, the motor control device may further include a waiting time period setting unit which determines the predetermined waiting time period based on at least one of a regenerative resistor of the regenerative circuit, a capacity of the motor, and a load of the motor.

According to one aspect of the present invention, the motor control device may further include a threshold voltage changer which changes the predetermined threshold voltage based on the DC voltage detected by the voltage detector.

According to one aspect of the present invention, in the motor control device, the regenerative controller may not wait until the predetermined waiting time period has elapsed when the connector is not connected to the DC voltage unit of the another motor control device.

Further, according to one aspect of the present invention, a motor control system includes the above-mentioned motor control devices, the connectors of the motor control devices being connected to each other.

Further, according to one aspect of the present invention, in the motor control system, each of the regenerative controllers of all of the motor control devices including the connectors connected to each other may actuate the regenerative circuit independently of operation of the regenerative controller of another motor control device.

Further, one aspect of the present invention is a method for controlling a motor control device including a DC voltage unit which inputs a DC voltage, a regenerative circuit included in the DC voltage unit, an inverter which converts the DC voltage in the DC voltage unit into an AC voltage that is output to a motor, a voltage detector which detects the DC voltage in the DC voltage unit, and a regenerative controller which controls whether or not to actuate the regenerative circuit based on the DC voltage detected by the voltage detector. The method includes waiting until a predetermined waiting time period has elapsed, and then actuating the regenerative circuit, independently of operation of a regenerative controller of the another motor control device after it is detected that the DC voltage exceeds a predetermined threshold voltage.

According to an embodiment of the present invention, the concentration of the regenerative load on a certain control device among the motor control devices connected to each other in a common bus system can be easily prevented.

Obviously, numerous modifications and variations of the present invention are possible in light of the above teachings. It is therefore to be understood that within the scope of the appended claims, the invention may be practiced otherwise than as specifically described herein.

The invention claimed is:

1. A motor control device, comprising:
   DC voltage circuitry configured to obtain a DC voltage;
   an inverter configured to convert the DC voltage obtained by the DC voltage circuitry into an AC voltage that is output to a motor;
   a voltage detector configured to detect the DC voltage obtained by the DC voltage circuitry; and
   regenerative controller circuitry configured to control actuation of a regenerative circuit in the DC voltage circuitry and to change a predetermined threshold voltage, based on the DC voltage detected by the voltage detector,
   wherein the regenerative controller circuitry is further configured to wait until a predetermined waiting time period has elapsed and thereafter actuate the regenerative circuit, independently of actuation control by second regenerative controller circuitry in a second motor control device that also obtains the DC voltage, after the voltage detector detects that the DC voltage exceeds the predetermined threshold voltage.

2. The motor control device according to claim 1, further comprising:
   a connector configured to connect the DC voltage circuitry to second DC voltage circuitry of the second motor control device,
   wherein the connector is further configured to connect the DC voltage circuitry to a converter configured to convert an AC voltage from an AC source into the DC voltage obtained by the DC voltage circuitry, and a capacitor.

3. The motor control device according to claim 2, wherein the predetermined waiting time period is set based on at least one of a regenerative resistor of the regenerative circuit, a capacity of the motor, and a load of the motor.

4. The motor control device according to claim 2, wherein the regenerative controller circuitry is further configured to not wait until the predetermined waiting time period has elapsed to actuate the regenerative circuit when the connector is not connected to the second DC voltage circuitry of the second motor control device.

5. The motor control device according to claim 1, wherein the predetermined waiting time period is set based on at least one of a regenerative resistor of the regenerative circuit, a capacity of the motor, and a load of the motor.

6. The motor control device according to claim 5, wherein the regenerative controller circuitry is further configured to change the predetermined threshold voltage based on the DC voltage detected by the voltage detector.

7. A motor control system, comprising:
   a plurality of motor control devices;
   a converter configured to convert an AC voltage from an AC source into a DC voltage;
   a capacitor; and
   a plurality of connectors each connected to the converter and the capacitor,
   wherein each of the motor control devices includes DC voltage circuitry configured to obtain the DC voltage from the converter via a respective connector of the connectors, an inverter configured to convert the DC voltage obtained by the DC voltage circuitry into an AC voltage that is output to a motor, a voltage detector configured to detect the DC voltage obtained by the DC voltage circuitry, and regenerative controller circuitry configured to control actuation of a regenerative circuit in the DC voltage circuitry and to change a predetermined threshold voltage, based on the DC voltage detected by the voltage detector, the regenerative controller circuitry is further configured to wait until a predetermined waiting time period has elapsed and thereafter actuate the regenerative circuit, independently of actuation control by respective regenerative controller circuitry included in other ones of the motor control devices, after the voltage detector detects that the DC voltage exceeds the predetermined threshold voltage, and
   the connectors of each of the motor control devices are connected to each other.

8. The motor control system according to claim 7, wherein the respective predetermined waiting time period for each of the motor control devices is set based on at least one of a regenerative resistor of the respective regenerative circuit, a capacity of the respective motor, and a load of the respective motor.

9. The motor control system according to claim 7, wherein the respective regenerative controller circuitry of each of the motor control devices is further configured to not wait until the respective predetermined waiting time period has elapsed to actuate the respective regenerative circuit when the respective connector is not connected to the respective DC voltage circuitry of the other ones of the motor control devices.

10. The motor control system according to claim 7, wherein the regenerative controller circuitry is one of a microcontroller, a digital signal processor (DSP), or a field programmable gate array (FPGA).

11. The motor control system according to claim 7, wherein the DC voltage circuitry includes a capacitor connected between a P-line and an N-line.

12. A method for controlling a motor control device, comprising:
   obtaining a DC voltage by DC voltage circuitry in a motor control device comprising an inverter configured to convert the DC voltage into an AC voltage that is output to a motor;
   detecting the DC voltage by a voltage detector in the motor control device;
   changing, using the regenerative controller circuitry, a predetermined threshold voltage based on the DC voltage detected by the voltage detector; and
   actuating a regenerative circuit in the DC voltage circuitry by regenerative controller circuitry in the motor control device, after waiting until a predetermined waiting time period has elapsed, independently of actuation control by second regenerative controller circuitry in a second motor control device that also obtains the DC voltage, after the voltage detector detects that the DC voltage exceeds the predetermined threshold voltage.

13. The method according to claim 12, wherein the motor control device further includes a connector configured to connect the DC voltage circuitry to second DC voltage circuitry of the second motor control device, and the connector is further configured to connect the DC voltage circuitry to a converter configured to convert an AC voltage from an AC source into the DC voltage obtained by the DC voltage circuitry and a capacitor.

14. The method according to claim 13, wherein the predetermined waiting time period is set based on at least one of a regenerative resistor of the regenerative circuit, a capacity of the motor, and a load of the motor.

15. The method according to claim 13, further comprising:
actuating the regenerative circuit by the regenerative controller circuitry, without waiting until the predetermined waiting time period has elapsed, when the connector is not connected to the second DC voltage circuitry of the second motor control device.

16. The method according to claim 12, wherein the predetermined waiting time period is set based on at least one of a regenerative resistor of the regenerative circuit, a capacity of the motor, and a load of the motor.

17. The motor control device according to claim 1, wherein the regenerative controller circuitry is one of a microcontroller, a digital signal processor (DSP), or a field programmable gate array (FPGA).

18. The motor control device according to claim 1, wherein the DC voltage circuitry includes a capacitor connected between a P-line and an N-line.

19. The method according to claim 12, wherein the regenerative controller circuitry is one of a microcontroller, a digital signal processor (DSP), or a field programmable gate array (FPGA).

20. The method according to claim 12, wherein the DC voltage circuitry includes a capacitor connected between a P-line and an N-line.

* * * * *